Nov. 25, 1941. J. W. KELSO Re. 21,957

MEANS FOR COOLING PIERCING POINTS OF TUBE ROLLING MILLS

Original Filed July 22, 1939

Inventor:
JOHN W. KELSO,
by: John E. Jackson
his Attorney.

Reissued Nov. 25, 1941

Re. 21,957

UNITED STATES PATENT OFFICE 21,957

MEANS FOR COOLING PIERCING POINTS OF TUBE ROLLING MILLS

John W. Kelso, East McKeesport, Pa., assignor to National Tube Company, a corporation of New Jersey Original No. 2,234,971, dated March 18, 1941, Serial No. 286,015, July 22, 1939. Application for reissue October 11, 1941, Serial No. 414,685

4 Claims. (Cl. 80—13)

This invention relates to tube or pipe rolling mills and, particularly, to an improved means for cooling the piercing points thereof.

In one method of manufacturing pipes or tubes, as is well known to those skilled in the art, it is the practice to provide a mandrel bar having a piercing point on the end thereof and to initially form the tube or pipe by forcing a solid hot billet over the piercing point and mandrel bar, thereby piercing the same which, of course, results in the shell surrounding and enclosing therein both the mandrel bar and the piercing point during the piercing operation. Consequently, the mandrel bar and piercing point become extremely hot and overheated after a short period of use and become distorted, thereby rendering them unfit for further use. It is now the general practice to cool the mandrel bars by making them hollow and supplying a cooling fluid thereto to cool the same, thereby eliminating any danger of them becoming overheated and distorted. However, no provision has been made for cooling the piercing points, especially the outer surfaces thereof and dissipating the heat absorbed thereby from the hot steel billets. It will be seen that if these piercing points are permitted to become overheated, which easily happens in the case of a relatively long shell especially of a small diameter, they will reach such a heat that the points thereof become blunt and distorted which renders them unfit for further service and necessitates a replacement thereof.

Accordingly, it is one of the objects of the present invention to provide an improved means for cooling piercing points of tube or pipe rolling mills which is very effective in its operation and use, thereby completely dissipating the heat therefrom.

It is another object of the present invention to provide an improved means for cooling piercing points of tube or pipe rolling mills which is simple and inexpensive in its construction, and, at the same time, one that is rugged and easily maintained.

Various other objects and advantages of this invention will become more apparent in the course of the following specification, and will be particularly pointed out in the appended claims.

In the accompanying drawing there is shown, for the purpose of illustration and description, one embodiment which my invention may assume in practice.

Figure 1:
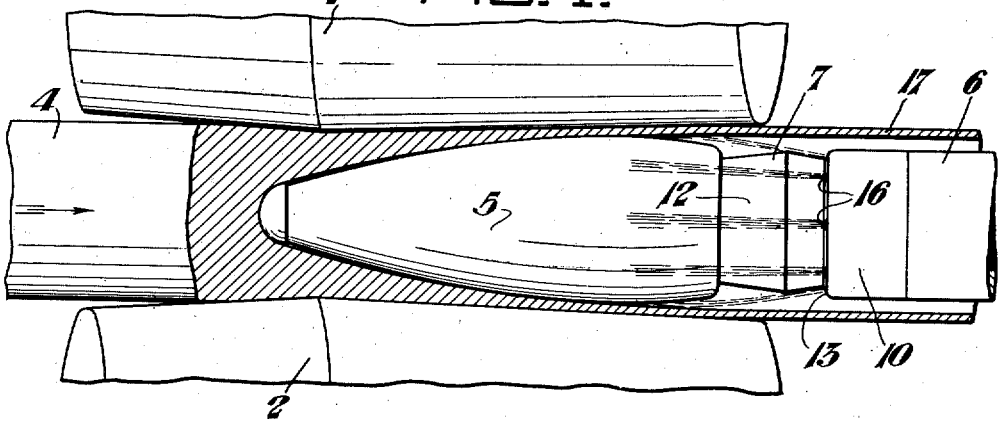
Figure 1 is a plan partly in section of the improved means for cooling piercing points of my invention.

Referring more particularly to the drawing, there is shown a pair of driven metal-working rolls 2 and guides 3 of the conventional type for drawing a hot steel billet 4 over a piercing point 5 and hollow mandrel bar 6 to pierce and elongate the same, a practice which is well known to those skilled in the art.

According to the present invention, there is disposed on the outer end of the mandrel bar 6, between the end thereof and the piercing point 5, a bar cap member 7 having a reduced inner threaded end portion 8 which is screwed into the outer end of the mandrel bar. On the inner end of the bar cap 7, there is arranged an outwardly tapered or tang portion 9 of a relatively small diameter on which the piercing point 5 is loosely disposed.

The inner portion 10 of the intermediate part of the bar cap 7 has an outer diameter substantially equal to the outer diameter of the mandrel bar 6 and the outer portion 12 of the intermediate part of the bar cap has an outer diameter slightly smaller than the outer diameter of both the mandrel bar and piercing point so as to provide an angular shoulder portion 13 around the outer edge of the inner portion 10.

There is arranged axially of the bar cap 7 and extending from the inner end thereof through the reduced portion 8 to a point intermediate the bar cap, a cooling fluid passageway 14 which has preferably a threaded portion 14a on the outer end thereof by which the bar cap is connected to a cooling fluid supply line within the mandrel bar 6.

There is disposed within the inner portion 10 of the intermediate part of the bar cap 7 around the passageway 14, a plurality of radially extending fluid passageways 15 communicating therewith and there is angularly arranged in and around the angular shoulder portion 13 thereof an equal number of orifices or jets 16 which communicate with the passageways 15. The part of the reduced outer portion 12 of the bar cap next to the angular flange portion 13 is preferably tapered or angularly arranged and the orifices or jets 16 are preferably arranged tangential or parallel thereto so that a circular spray is formed as the cooling fluid issues from the jets thereagainst and is directed outwardly thereby against the inner walls of the shell 17 being formed from the billet at substantially the point of the contact of the same with the largest diameter of the piercing point, as is shown in Figure 1.

While the improved cooling means of my invention is shown incorporated with a piercing point for the purpose of cooling the same, it will be understood that my improved cooling means can be used in connection with any other type of point or mandrel bar plug, such as, for example, in connection with the type of plug used on rotary rolling mills for sizing and expanding pipe.

Figure 2:
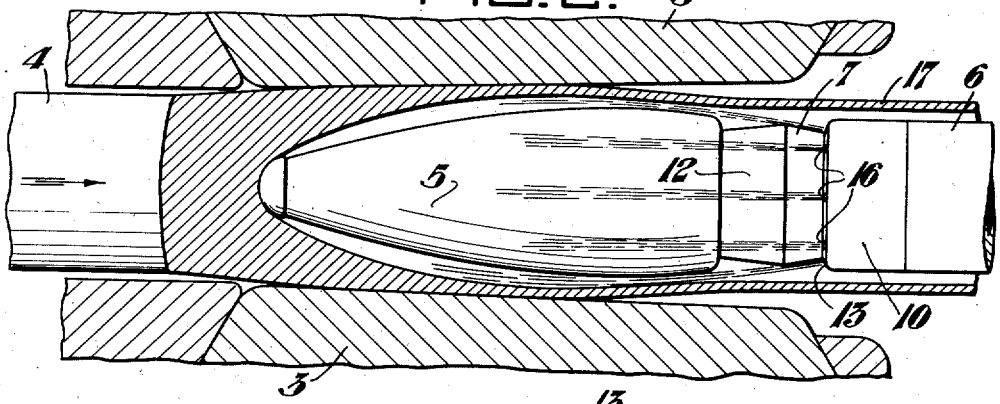
Figure 2 is an elevation partly in section thereof.
Figure 3:
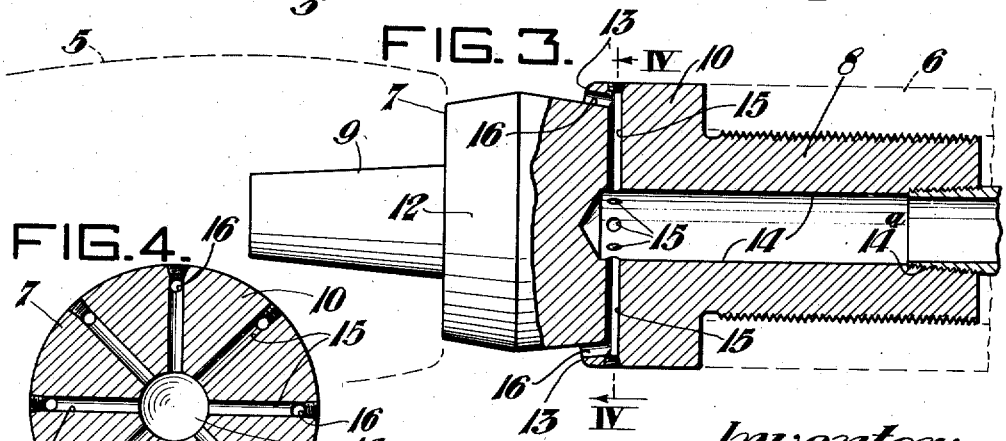
Figure 3 is an enlarged plan partly in section of the mandrel cap.
Figure 4:
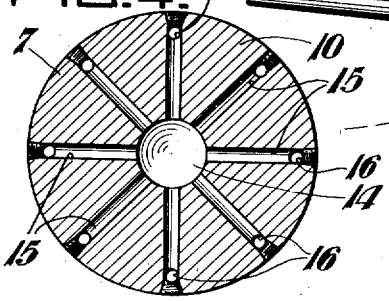
Figure 4 is a sectional view taken on lines IV—IV of Figure 3.

It will be understood that the cooling fluid, preferably water, is introduced under pressure from a source of supply into and through the hollow mandrel bar 6 into the passageway 14 in the bar cap 7, into and through the radially extending passageways 15 and out through the angularly arranged jets or orifices 16 in the angular shoulder portion 13 against the angular surface of the portion 12, thereby forming a circular spray which is delivered against the inner walls of the shell 17 at the piercing point as the shell is being formed, thereby cooling the piercing point as well as the walls of the shell. It will be noted that, due to the shell assuming an oval sectional conformation in the working zone, as shown in Figure 2 of the drawing, two cavities are formed, one at each side of the shel between the inner surface thereof and the piercing point, that is, there is always a clearance therebetween at the sides of the piercing point on which the guides 3 are disposed during the drawing operation, thereby permitting the cooling fluid to pass along the exterior surface of the piercing point at these points so as to reach practically the entire exterior surface of the same.

As a result of my invention, it will be seen that there is provided a cooling means which quickly and effectively dissipates the heat absorbed by the piercing point from the hot steel billet, thereby eliminating the danger of the piercing point from becoming overheated and distorted.

While I have shown and described an embodiment of my invention, it will be understood that this embodiment is merely for the purpose of illustration and description, and that various other forms may be devised within the scope of the invention, as defined in the appended claims.

I claim:

1. In a tube rolling mill, a mandrel bar, a mandrel plug disposed on the outer end of said mandrel bar, said mandrel bar being constructed and arranged so that a cooling fluid can be conveyed therethrough, and means arranged on the end of said mandrel bar for delivering the cooling fluid outwardly from the end thereof toward said mandrel plug whereby the cooling fluid is directed over and around the exterior surface of the mandrel plug.

2. In a tube rolling mill, a mandrel bar, a mandrel plug disposed on the end of said mandrel bar, said mandrel bar being constructed and arranged so that a cooling fluid can be conveyed therethrough, and means interposed between the end of said mandrel bar and said mandrel plug for delivering a circular spray of cooling fluid from the interior of said mandrel bar to the exterior surface of the mandrel plug.

3. In a tube rolling mill, a mandrel bar, a mandrel plug disposed on the end of said mandrel bar, said mandrel bar being constructed and arranged so that a cooling fluid can be conveyed therethrough, means interposed between the end of said mandrel bar and said mandrel plug for closing the end of said bar, and a plurality of jets concentrically arranged around said means communicating with the interior of said mandrel bar, said jets being arranged so as to deliver a circular spray of cooling fluid from the interior of said mandrel bar to the exterior surface of said mandrel plug.

4. In a tube rolling mill, a mandrel bar, a bar cap arranged on the outer end of said mandrel bar, a mandrel plug disposed on the outer end of said bar cap, said mandrel bar being constructed and arranged so that a cooling fluid can be conveyed therethrough, a plurality of jets concentrically positioned around said bar cap communicating with the interior of said mandrel bar, said jets being arranged so as to deliver a circular spray of cooling fluid from the interior of said mandrel bar to the exterior surface of said mandrel plug.

JOHN W. KELSO.